Apr. 3, 1923.
A. A. EICH
1,450,318
PULVERIZER AND QUACK GRASS DESTROYER
Filed May 26, 1921     2 sheets-sheet 1
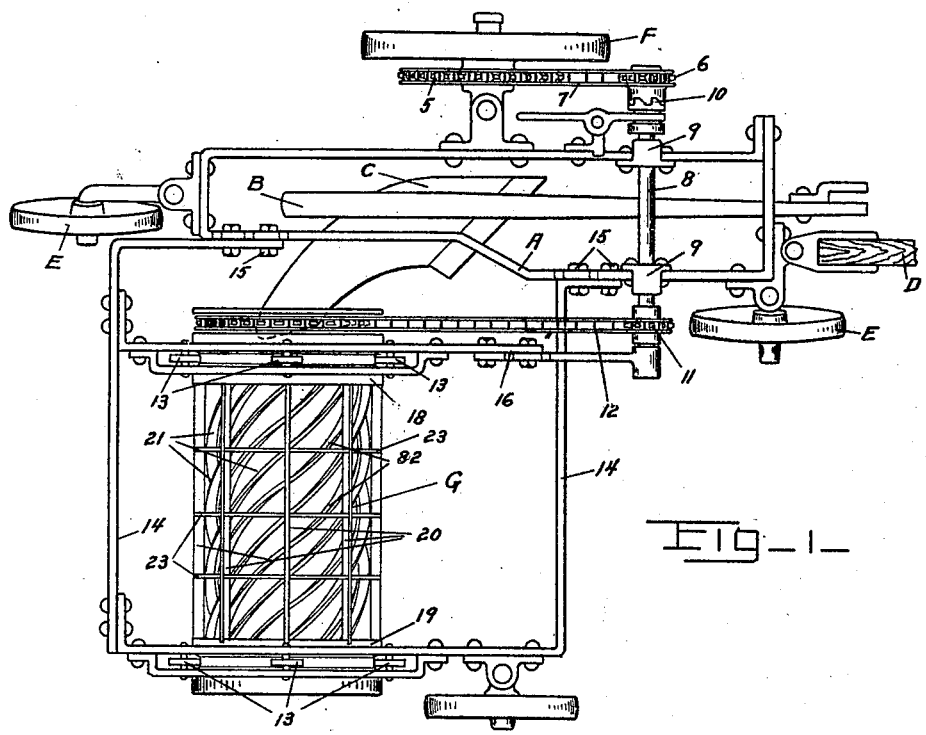
Fig-1-
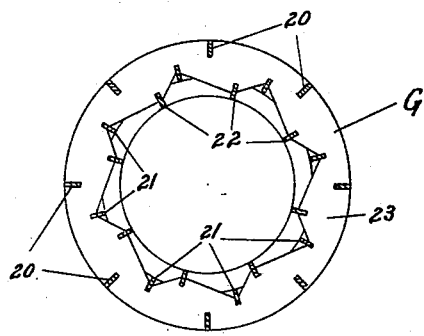
Fig-4-
Inventor
ALBERT A EICH
By *[signature]*
Attorney Inventor
ALBERT A EICH Patented Apr. 3, 1923.

1,450,318

UNITED STATES PATENT OFFICE.

ALBERT A. EICH, OF RICHMOND, MINNESOTA.

PULVERIZER AND QUACK-GRASS DESTROYER.

Application filed May 26, 1921. Serial No. 472,856.

*To all whom it may concern:*

Be it known that I, ALBERT A. EICH, a citizen of the United States, residing at Richmond, in the county of Stearns and State of Minnesota, have invented certain new and useful Improvements in Pulverizers and Quack-Grass Destroyers, of which the following is a specification.

This invention relates to farm implements and the main object is to provide a quack grass destroying machine and ground pulverizer of an improved type, which may be attached to an ordinary plow carriage and caused to be operated in conjunction with the plow carried thereby. Further objects will be disclosed in the course of the following specification and are illustrated in the accompanying drawings, in which:

Fig. 1 is a plan view of a plow carriage showing the application of my improved pulverizer and quack destroyer thereto.

Fig. 4 is a section on the line 4—4 in Fig. 3.

Figure 2:
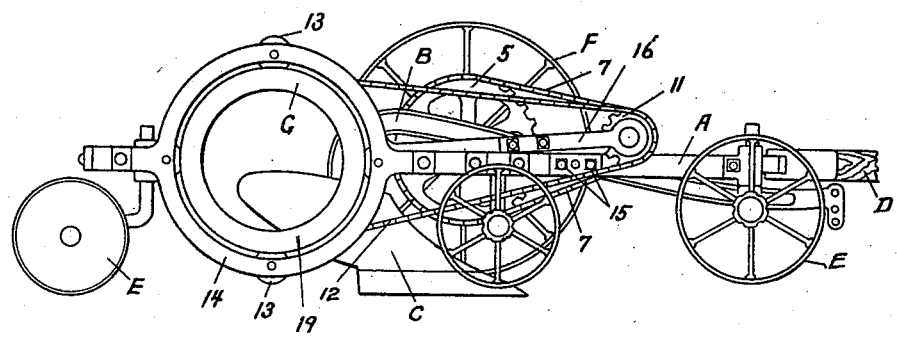
Fig. 2 is a side view of the machine as seen in Fig. 1.
Figure 3:
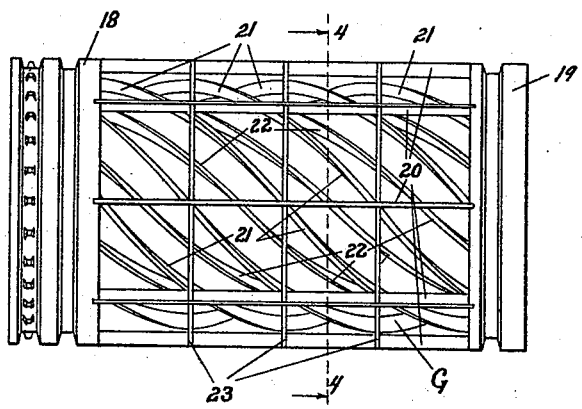
Fig. 3 is an enlarged detail view of the drum removed from the machine.

Referring to the drawings by reference characters A designates the frame of an ordinary plow carriage having a plow beam B supporting a plow C. Said carriage is drawn by a tongue D and supported on two small wheels E and a larger wheel F, in the usual manner.

To the wheel F I secure a large sprocket gear 5 which is connected to a sprocket pinion 6 by a sprocket chain 7. The pinion 6 is carried on the end of a shaft 8 journaled in bearings 9 on the main frame A, and which is provided with a hand operated clutch 10 so that it may be thrown in or out of gear with the pinion 6. The opposite end of the shaft 8 is provided with a sprocket pinion 11 which drives a drum G through the medium of a sprocket chain 12.

The drum G is rotatably mounted in bearings 13 in an auxiliary frame 14 which is bolted to the main frame as at 15. The frames are provided with several bolt holes so that the frame 14 may be adjusted slightly back and forth relative to the plow frame. When such an adjustment is made it is of course necessary to adjust the length of the chain 12 and also that of a radius rod 16 which extends from the shaft 8 at one end and at the other end holds the bearing rollers 13 which support the inner end of the drum.

The drum itself consists of two end collars 18 and 19 which are connected by a series of longitudinal bars 20. Immediately within the bars 20 is a series of spirally arranged agitating bars 21, and within this series is an alternate concentric series of inner spiral bars 22. Spaced at intervals between the ends of the drum are a number of rings or hoops 23 which are provided with notches in which may be secured the bars 20, 22 and 21 (see especially Fig. 4). Thus the drum is made very rigid, as all the spiral, longitudinal and circular members which make it up are all braced against each other.

In the operation and use of the machine, as the plow raises the dirt being plowed, it lays it over into the inner end of the drum, which, as it rotates, pulverizes the dirt, separating the weeds and stones from it. The dirt as it disintegrates falls through between the bars 20, 21 and 22 back onto the ground, while the stones and quack grass, it is found, will worm their way out of the outer end of the drum and fall on top of the plowed ground where the weeds will dry up and be destroyed.

From the foregoing it is believed that my invention will be clearly understood and its advantages and merits realized by all those familiar with the art. I, however, do not desire to limit the invention to the particular construction shown, and in constructing the machine may see fit to embody suitable modifications, provided, however that such modifications come within the spirit and scope of the appended claims.

Having now therefore fully shown and described my invention what I claim to be new and desire to protect by Letters Patent is:

1. The combination with a plow, of a rotatably mounted drum adapted to receive material therefrom at one end, means for rotating the drum, said drum consisting of inner and outer series of alternate spirally arranged spaced bars, longitudinal bars positioned thereabout, and circular members, positioned at intervals throughout the length of the drum, adapted to secure all of said bars together in relatively rigid position.

2. The combination with a plow, of a rotatably mounted drum adapted to receive material therefrom at one end, means for rotating the drum, said drum consisting of inner and outer series of spirally arranged spaced bars and longitudinal bars spaced thereabout, and circular members positioned at intervals throughout the length of the drum, said members having inner and outer series of notches adapted to rigidly retain said spirally arranged and longitudinal bars, respectively, as and for the purpose set forth.

In testimony whereof I affix my signature.

ALBERT A. EICH.